Sept. 16, 1969  M. HOFFMANN ETAL  3,467,897
HOUSING ARRANGEMENT FOR RECTIFIER DEVICE
Filed April 20, 1966  2 Sheets-Sheet 1

3,467,897
HOUSING ARRANGEMENT FOR
RECTIFIER DEVICE
Manfred Hoffmann and Roland Wendelin, Erlangen, and
Erich Katscher, Marloffstein, Germany, assignors to
Siemens Aktiengesellschaft, a corporation of Germany
Filed Apr. 20, 1966, Ser. No. 545,215
Claims priority, application Germany, Apr. 23, 1965,
S 96,711
Int. Cl. H01l 1/02, 1/12; H02b 1/04
U.S. Cl. 317—234                           16 Claims

ABSTRACT OF THE DISCLOSURE

A silicon rectifier is positioned between a pair of spaced cooling bodies forming a single structural unit with the rectifier and structural components. The structural components comprise a guide plate of electrical insulating material fixedly positioned with the rectifier between the cooling bodies. The guide plate extends radially of the rectifier. An electrical fuse is supported on a front plate of electrical insulating material extending parallel to the axis of symmetry of the rectifier. The front plate is spaced from and parallel to and affixed to another plate of electrical insulating material. A base plate of electrical insulating material is affixed to the front plate.

---

The present invention relates to a housing arrangement for a rectifier device. More particularly, the invention relates to a housing arrangement for a rectifier device such as, for example, a thyristor, and its associated circuitry.

A semiconductor diode or thyristor may be positioned in a substantially disc-shaped housing to form a so-called disc cell. The heat dissipated by the semiconductor rectifier may be removed from both substantially planar surfaces of the disc-shaped housing by appropriate cooling bodies or heat sinks. The cooling bodies usually have a considerably greater thermal expansion coefficient than that of the disc-shaped housing.

In a known rectifier unit, there are components other than the semiconductor body electrically connected therewith. Such components may include fuses. A thyristor unit includes a circuit for the gate or control electrode.

As a rule, so-called wiring elements are connected in parallel with silicon rectifiers in rectifier devices. A thyristor is also directly provided with elements of its control current circuit. These structural components may be combined into one unit with the rectifier and the cooling body assigned thereto. A guide strip or groove at the cooling body permits the installation or insertion of the unit into an appropriate mounting frame of the rectifier device.

It is known to arrange non-controlled silicon rectifiers and thyristors for high current intensities of about 1000 amperes and more, inside a disc-shaped housing where they constitute a so-called disc-cell. Cooling bodies can be arranged on both surfaces of the cell, and their expansion and weight will depend essentially on the dissipated heat to be removed. Their potentials may vary considerably from each other if the rectifier is controlled by a stage or phase control. In the presence of the aforementioned currents, the rectifiers can only be connected with a fuse and a conductor of the rectifier device, by means of screws. In the event of a disturbance, the fuse must be readily accessible so that it may be easily and rapidly changed. The present invention solves the problem by designing a structural unit with a disc-cell for high current intensities, and in a manner whereby all requirements will be fulfilled.

The principal object of the present invention is to provide a new and improved housing arrangement for a rectifier device. The housing arrangement of the present invention provides a rectifier device and its associated circuitry and components as a single mechanical structure.

The present invention relates, more specifically, to a rectifier device with a non-controlled or a controlled silicon rectifier, in a disc-shaped housing and forming a single unit with the provided structural components, as well as with a cooling body. In accordance with the present invention, the silicon rectifier, as well as a guide plate, which extends in radial directions of said rectifier and is comprised of electrical insulating material, is positioned between two cooling members, each of which abuts against a corresponding planar surface of the silicon rectifier. At least one fuse and the terminals for the main electrodes of the silicon rectifier are suggested on a front plate which extends parallel to the axis of symmetry of the silicon rectifier. Insofar as this relates to a thyristor whose control path contains preset firing pulses, via at least one transmitter, said transmitter, as well as the other elements of the control current circuit, are preferably affixed to another insulating plate arranged approximately in parallel with the front plate. The entire device forms one structural unit which extends in longitudinal direction of the cooling bodies.

The rectifier device may comprise a thyristor having a gate electrode. The operation control circuit is then connected to and controls the gate electrode of the thyristor.

In order that the present invention may be readily carried into effect, it will now be described with reference to the accompanying drawings, wherein.

Figure 1:
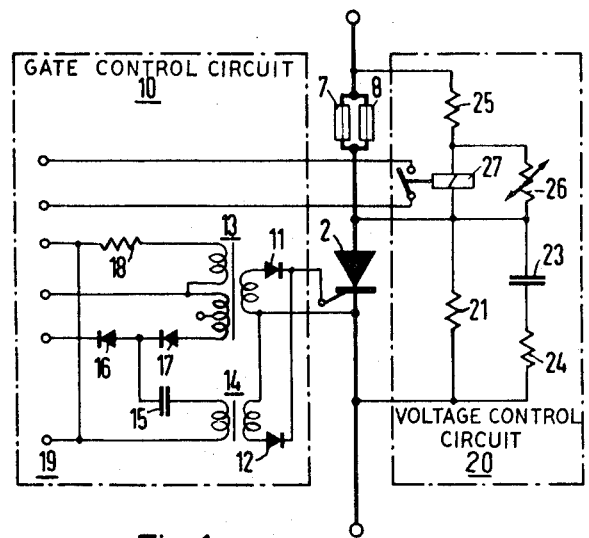
FIG. 1 is a circuit diagram of a thyristor and its associated circuitry and components which may be housed in the housing arrangement of the present invention.

In FIG. 1, a thyristor 2 is connected in series with the parallel connection of two fuses 7 and 8. The thyristor 2 may be positioned in a disc-shaped housing and may develop 1000 amperes or more. The thyristor 2 may be connected in a rectifier circuit and the fuses 7 and 8 permit the cutoff of excessive currents and reduce the shut down period in the event of short circuit. A gate control circuit 10 for controlling the operation of the thyristor by controlling the gate or control electrode current is associated with the thyristor 2, as is a voltage control circuit 20 for controlling applied voltages. In order to maintain the clarity of illustration, only the essential components and circuitry are shown in FIG. 1.

The gate control circuit 10 of the thyristor 2 is connected to a suitable control system (not shown in the figures) via a plurality of terminals 19. A pair of control transformers 13 and 14 is connected in parallel to the terminals 19. The transformer 14 provides firing pulses having a steep leading edge of very high sloped leading edge; such pulses being utilized to fire a silicon thyristor or to simultaneously fire a plurality of thyristors in series or parallel connection. The primary current of the transformer 14 is the discharge current of a capacitor 15 connected in the primary circuit of said transformer between a diode 16, connected to one of the terminals 19, and the primary winding of said transformer. The capacitor 15 discharges through the diode 16.

The transformer 13 provides firing pulses having a sufficient duration. The transformer 13 comprises two primary windings, one of which is utilized for reverse magnetization of the core of said transformer. The secondary windings of the transformers 13 and 14 are connected in parallel, via blocking diodes 11 and 12, between the gate or control electrode and the cathode of the thyristor 2. This provides firing pulses of sufficiently steep leading edge and of sufficient duration for controlling the operation of the thyristor 2. A diode 17, which is connected between the diode 16 and one of the primary windings of the transformer 13, prevents the discharge of the capacitor 15 therethrough.

Voltage control circuitry may be utilized with the thyristor 2 and may comprise the voltage control circuit 20. The voltage control circuit 20 may comprise a stabilizing resistor 21 connected across the thyristor 2 between the cathode and anode thereof and a capacitor 23 connected in series with a resistor 24 across said thyristor between said cathode and said anode and in parallel with said stabilizing resistor. A resistor 25 is connected in series with the energizing winding of a relay 27 across the fuses 7 and 8, so that if said fuses "blow" and open the anode circuit of the thyristor 2, the full voltage, which may, under certain circumstances be several thousand volts, is applied to the resistor 25 and relay 27 winding. In order to protect the relay 27 winding and to maintain the voltage across said relay substantially constant, although the fuses 7 and 8 may "blow," a varistor 26 is connected across said relay winding. The resistance of the varistor 26 varies as the voltage across it and functions to maintain the voltage across the relay 27 winding at substantially 30 volts.

Figure 3:
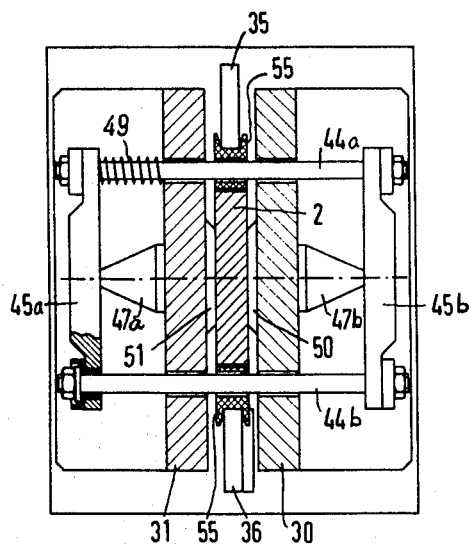
FIG. 3 is a sectional view taken along the lines III—III of FIG. 2.
Figure 2:
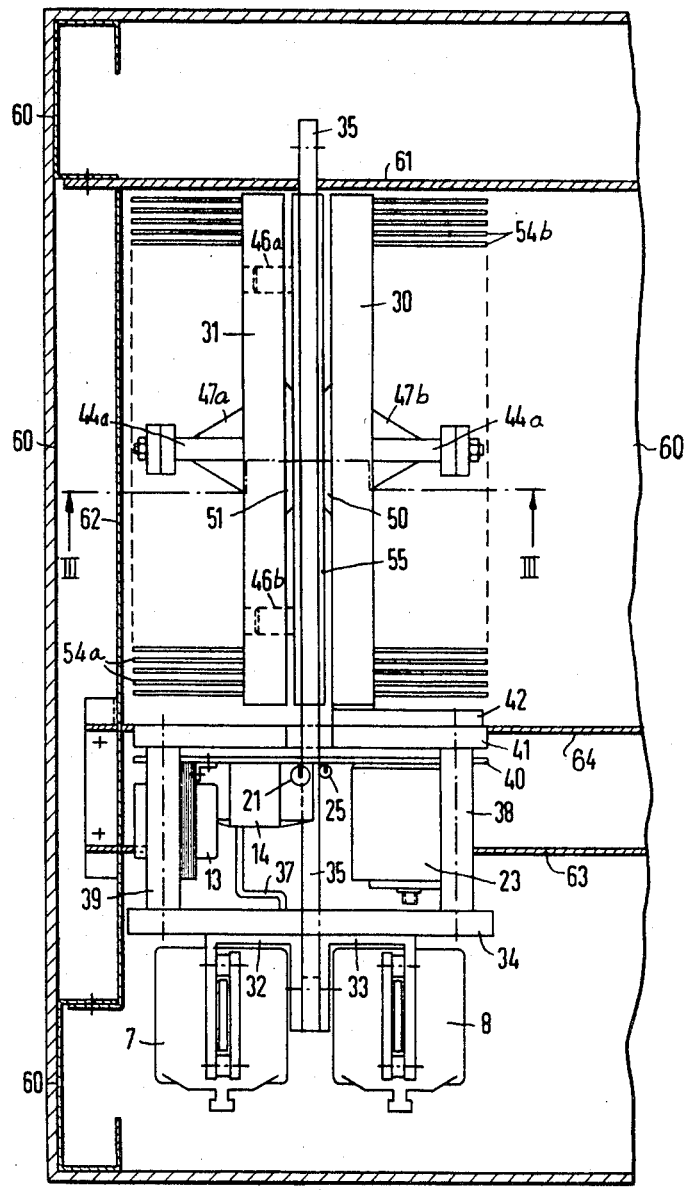
FIG. 2 is a top view of an embodiment of the positioning and arrangement of components in the housing arrangement of the present invention.

In FIGS. 2 and 3, the gate control circuit 10, the voltage control circuit 20, the thyristor 2, the fuses 7 and 8 and cooling bodies 30 and 31 are housed as a single mechanical structure. The fuses 7 and 8 are affixed to a front plate 34 of electrical insulating material via substantially U-shaped electrically conductive parts 32 and 33, the upper parts of which are shown in FIG. 2, which also provide electrical connections between said fuses and an input bus bar 35. The bus bar 35 is preferably of copper and is part of a rectifier system structure in which the housing arrangement of the present invention may be positioned and connected.

An output bus bar 36 is positioned in the same manner (FIG. 3) under the fuses 7 and 8 and is electrically connected to the cooling body 31 via an electrical connector 37 (FIG. 2). The front plate 34 is affixed to an insulation plate 41 of electrical insulating material via spacing pins 38 and 39 (FIG. 2). The insulation plate 41 may be affixed to the cooling body 30 via an angle member 42 (FIG. 2). A base ptale 40 of electrical insulating material (FIG. 2) supports a printed circuit for all the components of the gate control and voltage control circuits 10 and 20 and is affixed to the insulation plate 41. The components of the gate control and voltage control circuits 10 and 20 are preferably affixed to the base plate 40. The gate control circuit 10 and the voltage control circuit 20 are thus readily accessible from all sides and may be readily inspected, repaired or replaced.

The cooling bodies 30 and 31 are removably coupled to each other via bolts 44a and 44b (FIGS. 2 and 3) which are preferably variable pressure bolts. Centering pins 46a and 46b (FIG. 2) position the cooling bodies relative to the thyristor 2. The pressure of the bolts 44a and 44b is applied uniformly over the substantially planar surface areas of the semiconductor body of the thyristor 2 (FIG. 3) via the cooling bodies 30 and 31 by substantially conical or frustoconical pressure members 47a and 47b which abut against said cooling bodies and extend from bolt linking bridges 45a and 45b, respectively (FIG. 3).

The cooling body 30 has a substantially frusto-conical projecting portion 50 having a base area which abuts against one of the opposite, spaced, parallel, substantially planar surfaces of the semiconductor body of the thyristor 2 and the cooling body 31 has a substantially frusto-conical projecting portion 51 having a base area which abuts against the other of the opposite, spaced, parallel, substantially planar surfaces of said semiconductor body. The projecting portions 50 and 51 of the cooling bodies 30 and 31, respectively, may abut against the semiconductor body of the thyristor 2 with a pressure of several hundred kilograms per square millimeter.

A plurality of cooling fins 54a and 54b, respectively (FIG. 2) extend from the surfaces of the cooling bodies 31 and 30 opposite the surfaces from which their projecting portions 50 and 51 extend. The cooling fins 54a and 54b of each of the cooling bodies 31 and 30 extend substantially perpendicularly from said cooling bodies and substantially parallel to each other to provide an essentially uniform flow velocity of the coolant in the spaces between said cooling fins. The cooling fins 54a and 54b comprise good heat conducting material such as, for example, electrolytic copper.

As shown in FIG. 3, the semiconductor body of the thyristor 2 may be substantially concentrically positioned in a hole formed through a guide plate 55 of electrical insulating material. The guide plate 55 is fixedly positioned between the cooling bodies 30 and 31 and may serve as a guide during the positioning of the rectifier housing structure of the present invention in the structure of a rectifier system. As shown in FIG. 3, the bolts 44a and 44b are coupled to each other at the ends of each of said bolts by the bolt linking bridges 45a and 45b, which are of electrical insulating material. The bolts 44a and 44b are electrically insulated from the cooling bodies 30 and 31 by sleeves of electrical insulation in the apertures formed through said cooling bodies through which said bolts pass.

Adjusting springs 49, one of which is shown in FIG. 3, may be coaxially positioned on each of the bolts 44a and 44b between the corresponding bolt linking bridge 45a or 45b and the corresponding cooling body to prevent the generation of undesirable voltages at variable temperatures. A groove is formed along the upper edge of the plate 55 and a groove is formed along the lower edge of said plate (FIG. 3). The grooves in the upper and lower edges of the plate 55 extend parallel to such edges and guide the input and output bus bars 35 and 36, respectively for sliding movement therein; said bus bars being positioned in said grooves (FIG. 3).

A plurality of rectifier housing structures of the present invention may be mounted adjacent each other in a single cabinet such as, for example, a cabinet 60, as partially shown in section in FIG. 2. The rectifier housing structures would be positioned in the cabinet 60 in a manner whereby the coolant flows freely along the cooling fins 54a and 54b of each of said housing structures. An insulating plate 61 and an insulating plate 62 may be provided inside the cabinet 60 to support various electrical conductors. The insulating plates 61 and 62 are positioned transverse to each other and serve any suitable support, guide and/or other function. The insulating plates 61 and 62 also direct the flow of coolant through the cabinet. They are shown in section. Additional insulating plates 63 and 64, shown in section in FIG. 2, may be provided in the cabinet 60 for various suitable purposes such as, for example, supporting the input and output bus bars 35 and 36. The insulation plate 41 of the rectifier housing structure of the present invention is preferably provided with dimensions suitable for directing or guiding the flow of coolant through the cabinet 60 when said rectifier housing structure is positioned in said cabinet.

While the invention has been described by means of a specific example and in a specific embodiment, we do not wish to be limited thereto, for obvious modifications will occur to those skilled in the art without departing from the spirit and scope of the invention.

We claim:

1. A housing arrangement for a rectifier device comprising a silicon rectifier having an axis of symmetry, a pair of opposite spaced parallel substantially planar surfaces and an electrode affixed to each of said surfaces, said housing arrangement comprising:

a pair of spaced cooling bodies forming a single structural unit with said rectifier device, each of said cooling bodies being in abutment with a corresponding one of the electrodes on the planar surfaces of said silicon rectifier, said silicon rectifier being positioned between said cooling bodies; and structural means forming a single structural unit with said rectifier device and said cooling bodies, said structural means comprising a guide plate of electrical insulating material fixedly positioned with said silicon rectifier between said cooling bodies, said guide plate extending radially of said silicon rectifier, a front plate of electrical insulating material extending parallel to the axis of symmetry of said silicon rectifier, and an electrical fuse supported by said front plate.

2. A housing arrangement as claimed in claim 1, wherein said structural means comprises another plate of electrical insulating material, said front plate being spaced from and parallel to and affixed to said other plate.

3. A housing arrangement as claimed in claim 1, wherein each of said cooling bodies comprises means for applying substantially uniform pressure to said silicon rectifier.

4. A housing arrangement as claimed in claim 1, wherein a plurality of electrical fuses are supported by said front plate.

5. A housing arrangement as claimed in claim 1, wherein said guide plate comprises a plate of electrical insulating material having a hole formed therethrough for accommodating said silicon rectifier, said hole determining the position of said silicon rectifier between said cooling bodies.

6. A housing arrangement as claimed in claim 1, wherein said structural means further comprises coupling means for removably coupling said cooling bodies to each other on both sides of said silicon rectifier and spring means cooperatively positioned with said coupling means.

7. A housing arrangement as claimed in claim 2, wherein said silicon rectifier has a control electrode and an input and an output electrode and said structural means further comprises a base plate of electrical insulating material affixed to said front plate, an operation control circuit electrically connected to the control electrode of said silicon rectifier and supported by said base plate, a voltage control circuit electrically connected to the input and output electrodes of said silicon rectifier, each of said operation control circuit and said voltage control circuit comprising a printed circuit.

8. A housing arrangement as claimed in claim 3, wherein each of said cooling bodies has a cooling surface and each said cooling surface comprises the base area of a substantially frustoconical projecting portion extending from the corresponding cooling body and applying substantially uniform pressure to said silicon rectifier.

9. A housing arrangement as claimed in claim 5, wherein said guide plate has a pair of spaced opposite substantially parallel edges and a groove formed in each of said edges, and further comprising a circuit member positioned in one of said grooves and another circuit member positioned in the other of said grooves.

10. A housing arrangement as claimed in claim 9, further comprising circuit components, and wherein each of said circuit members is a bus bar and said bus bars connect an electrode of said silicon rectifier and said electrical fuse and connect the other electrode of said silicon rectifier and to said circuit components.

11. A housing arrangement as claimed in claim 7, wherein each of said cooling bodies has a pair of smaller lateral surfaces and the front plate, other plate and base plate of said structural means are positioned at one of the smaller lateral surfaces of each of said cooling bodies.

12. A housing arrangement as claimed in claim 1, wherein said rectifier device is a thyristor having a gate electrode and said operation control circuit is connected to and controls the gate electrode of said rectifier device.

13. A housing arrangement as claimed in claim 1, wherein said front plate is affixed to a surface of one of said cooling bodies, and further comprising another electrical insulating plate, joining means affixing said front and other electrical insulating plates to each other, a base electrical insulating plate, and further joining means affixing said base electrical insulating plate to said surface of said one of said cooling bodies.

14. A housing arrangement as claimed in claim 8, wherein each of said electrical insulating plates is affixed to a surface of said cooling body other than the cooling surface thereof.

15. A housing arrangement as claimed in claim 8, wherein each of said cooling bodies has a surface spaced from and substantially parallel to the cooling surface thereof, and further comprising a plurality of cooling fins extending from a surface of each of said cooling bodies spaced from and substantially parallel to the cooling surface thereof.

16. A housing arrangement as claimed in claim 15, wherein the cooling fins of each of said cooling bodies extend in substantially parallel relation to each other.

References Cited

UNITED STATES PATENTS

| | | | |
|---|---|---|---|
| 2,907,935 | 10/1959 | Nagorsen | 317—234 |
| 3,179,814 | 4/1965 | Stoudenmire et al. | 317—101 X |
| 3,206,646 | 9/1965 | Relation et al. | 317—100 |
| 3,280,389 | 10/1966 | Martin | 317—234 |
| 3,289,068 | 11/1966 | Healis | 321—8 |
| 3,293,508 | 12/1966 | Boyer | 317—234 |
| 3,310,716 | 3/1967 | Emis | 317—234 |
| 3,340,413 | 9/1967 | Drabik | 321—8 X |
| 3,371,227 | 2/1968 | Sylvan | 317—101 X |

FOREIGN PATENTS

| | | |
|---|---|---|
| 1,381,184 | 10/1964 | France. |
| 1,071,233 | 12/1959 | Germany. |

JAMES D. KALLAM, Primary Examiner

R. F. POLISSACK, Assistant Examiner

U.S. Cl. X.R.

317—101